Jan. 24, 1961  M. COVINI  2,969,139
DEVICE FOR TURNING OVER TYPOGRAPHIC LINES COMPOSED
BY A LINE-COMPOSING MACHINE
Filed May 14, 1959  2 Sheets-Sheet 1

Inventor:
Mario Covini
By: *[signature]*
Attorney

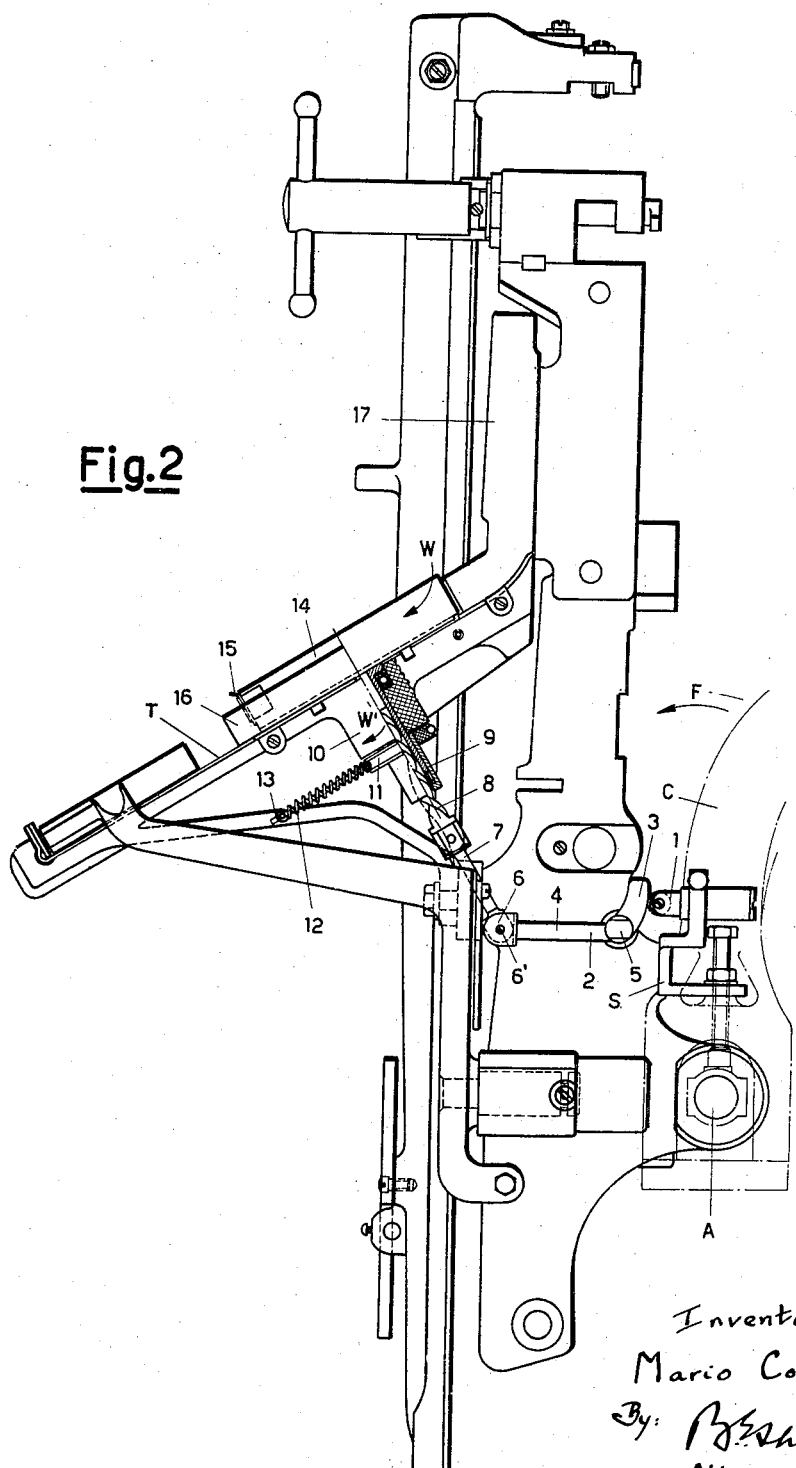

10 # United States Patent Office 2,969,139
Patented Jan. 24, 1961

2,969,139

DEVICE FOR TURNING OVER TYPOGRAPHIC LINES COMPOSED BY A LINE-COMPOSING MACHINE

Mario Covini, Milan, Italy, assignor to Linotype S.p.A., Milan, Italy, a company of Italy Filed May 14, 1959, Ser. No. 813,152

Claims priority, application Italy May 17, 1958

4 Claims. (Cl. 199—61)

The present invention concerns a device for the turning over of typographic lines composed by a line-composing machine, and meets the requirement—which is essential if texts are to be composed in languages in which the lines are read from the right-hand towards the left-hand, for instance Arabian and Hebrew—of turning the line over after composition.

In fact line-composing machines as conventionally used, present the line composed according to the orientation common for languages in which lines are read from left-hand towards right-hand: hence it is indispensable, for compositions in languages in which reading is from right-hand to left-hand, that the lines should be turned over by hand once they are composed or that there be provided, for obvious reasons of time economy, an automatic device effecting said overturning. The devices contrived by the prior art all have considerable complication in construction and, therefore, are very costly.

It is an object of the present invention to provide a simple, economical device safe in operation, for turning typographical lines over. Another object of the present invention is to provide a device as defined above, which is adapted also for operation under ordinary conditions for composition, that is, for lines to be read from left-hand to right-hand.

Other objects of the present invention will appear from the description made hereinafter.

According to the invention, a device is provided for turning over typographical lines composed by a line-composing machine provided with a line-founding pot for the lines oscillating about a horizontal axis, characterized in that it comprises in combination a thrust member rigid with a point of the founding pot for the lead for the lines, a square lever pivoted around a fixed point of the frame of said composing machine, said square lever comprising a first arm cooperating with said thrust member rigid with said pot and a second arm at the free end of which there is pivoted a member provided with a wide pitch helical threading, said member provided with wide pitch helical threading being in engagement with a nut fixed to a rotary platform adjacent the board for collecting the lines composed by said machine, said platform being adapted to receive individual composed lines, so that the thrust exerted by the pot upon said square lever causes a rotation by 180° of said platform thereby turning the typographical line over.

Moreover there is provided a return spring which returns the rotary platform to its starting position as soon as said rotation by 180° is terminated. On the rotary platform there is mounted a guide for the composed typographic lines, said guide being constituted by two parallel vertical walls.

Finally one end of said guide is provided with a removable wall for locking the composed typographical lines. If said removable wall is removed, the lines no longer locked can descend, once they are composed, direct onto the collecting board with which the machine is provided: this provision is adopted if the machine has to serve to compose texts with which reading is performed from left-hand to right-hand.

The invention will be made more fully clear by the detailed description that follows hereinafter and by the accompanying drawings, wherein:

Fig. 2 represents particularly, partly in view and partly in section, an embodiment of the device of the invention by way of example.

Figure 1:
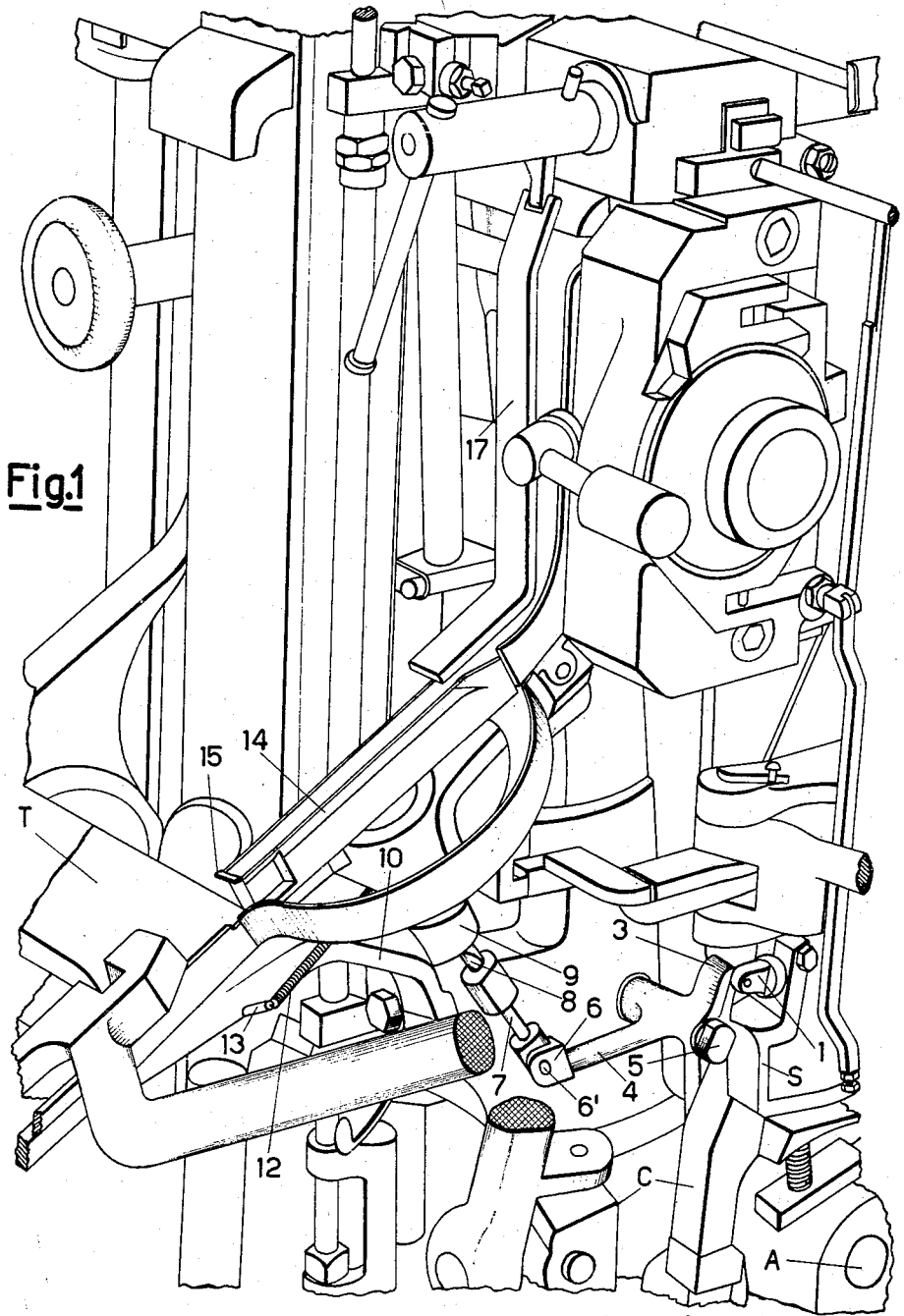
Fig. 1 is a perspective diagrammatical view of a line-composing machine equipped with the device according to the invention.

In the drawings, equal or homologous parts are indicated by the same reference numerals or symbols. Figure 1 represents the accommodation of the device according to the invention on a common line-composing machine; a detailed description of such machines is omitted herein, such machines being well-known by the skilled in the art. Figure 1 has a merely representative meaning an the following description refers more particularly to Figure 2 which is a more detailed description.

With reference to Figures 1 and 2 it will be noted that the pot C for founding the lines is pivoted around a horizontal axis A; as is known, with machines of the kind described, the pot oscillates to inject fused lead against the matrices and so the line is cast. Of the pot C a part is visible, namely the part hatched in Figure 2. To the arm of the pot C is fixed a thrust member 1 by any system, for instance by a stirrup S (Fig. 2).

At an axis 5, fixed to the framing of the machine, there is pivoted a square lever 2. The square lever 2 comprises a shorter arm 3 and a longer arm 4. As is clearly visible in Figure 2, the arm 3 is placed to face the thrust member 1 and cooperates therewith. At the free end 6 of the arm 4 there is pivoted, at 6', a link 7 to which there is connected a helical spindle 8 with wide pitch. The helical spindle 8 engages with a nut 9 fixed to a rotary platform 10. The platform 10 is supported on the framing of the machine in any suitable way. The platform 10 sustains the guide 14 for the composed lines which reach it from the slide 17 as they come from the lead-injection chamber (not shown). The guide 14 (Fig. 1) is formed by two parallel vertical walls which however may slightly diverge by way of a fan at one end as visible in Figure 1.

The guide 14 is closed at the end which in the rest position of the mechanism is turned downwards, by a removable stop, for instance by a plaque 15 as in Fig. 2. To prevent the lateral falling-down of the composed line, during the rotation of the guide 14, as will be set forth in the description of operation, there is provided a semi-circular protective apron 16 (Fig. 2).

For the return of the guide 14 to rest position after rotation, there is a helical spring 12 one end of which is fixed at 13 to the framing of the machine, while the other end is fixed to a grooved pulley 11 rigid with the platform 10. As visible clearly in Figure 2, the spring 12 winds up over a certain arc around the pulley 11. Finally the reference T indicates the board for collecting the composed lines with which any composing machine is commonly equipped.

Operation of the device hereinbefore described is very simple. Let it be supposed that the guide 14 has just received a composed line: in the meantime the subsequent line is in course of being composed. When the time comes to found the subsequent line, the pot C oscillates in the direction of the arrow F and so the member 1 rotates the square lever 2 in anti-clockwise direction as seen in Figure 2. The helical spindle 8 rotates the guide 14 in the direction of the arrow W: the direction of the threads of 8 and their pitch will obviously have to be proportioned in such a way that the rotation of the nut 9 as caused by the movement of the spindle 8, be accurately 180°. The composed line which finds itself on 14 cannot descend because it is retained by the plaque 15. The rotation by 180° turns the line over and when the rotation is at an end, the line falls onto the board T.

During the rotation, the lateral falling-down of the composed line is prevented by the semi-circular protective apron 16.

When the pot C appears to be ready for the founding of the following line, the pressure of 1 upon 3 ceases and the spring 12 returns the platform 10 to position and, therewith, the guide 14 as well, and the cycle can start again from beginning. It will be noted that the spring 12 is put under tension when the platform 10 is turning in the direction of the arrow W' (equidirectional with the arrow W). So far the operation of the device of the invention has been described herein if lines readable from the right-hand towards the left-hand are to be composed: if instead the composing machine composes normal lines, that is to say, lines readable from the left-hand towards the right-hand, it suffices to extract the stop 15 and the line just composed falls direct onto the board T.

As will be understood, the invention provides an extremely simple and economical device absolutely safe in operation; it will also be understood that all those modifications of constructive kind which are in the choice of the skilled in the art, do fall under the scope of the invention.

I claim:

1. A device for turning over typographical lines, composed of a line-composing machine, provided with a founding pot for the lines, oscillating around a horizontal axis, characterized in that it comprises, in combination, a thrust member rigid with a point of the founding pot for the lead for the lines, a square lever pivoted around a fixed point of the frame of said composing machine, said square lever comprising a first arm cooperating with said thrust member rigid with said pot and a second arm at the free end of which there is pivoted a member provided with a wide-pitched helical threading, said member provided with a wide-pitched helical threading being in engagement with a nut fixed to a rotary platform adjacent the board for collecting the lines composed by said machine, said platform being adapted to receive individual composed lines, so that the thrust exerted by the pot upon said square lever, causes a rotation of said platform by 180° thereby turning over the typographical line.

2. A device according to claim 1, characterized in that it comprises moreover a return spring adapted to return said rotary platform to its starting position as soon as the rotation by 180° has come to an end.

3. A device according to claim 1, characterized in that on said rotary platform there is mounted a guide for the typographical lines, said guide being constituted by two parallel vertical walls.

4. A device according to claim 3, characterized in that one end of said guide is provided with a removable stopping wall for said composed typographical lines.

No references cited.